Dec. 27, 1938.  M. IRELAND  2,141,867
ELECTRIC TOASTER
Filed June 30, 1937  2 Sheets-Sheet 1
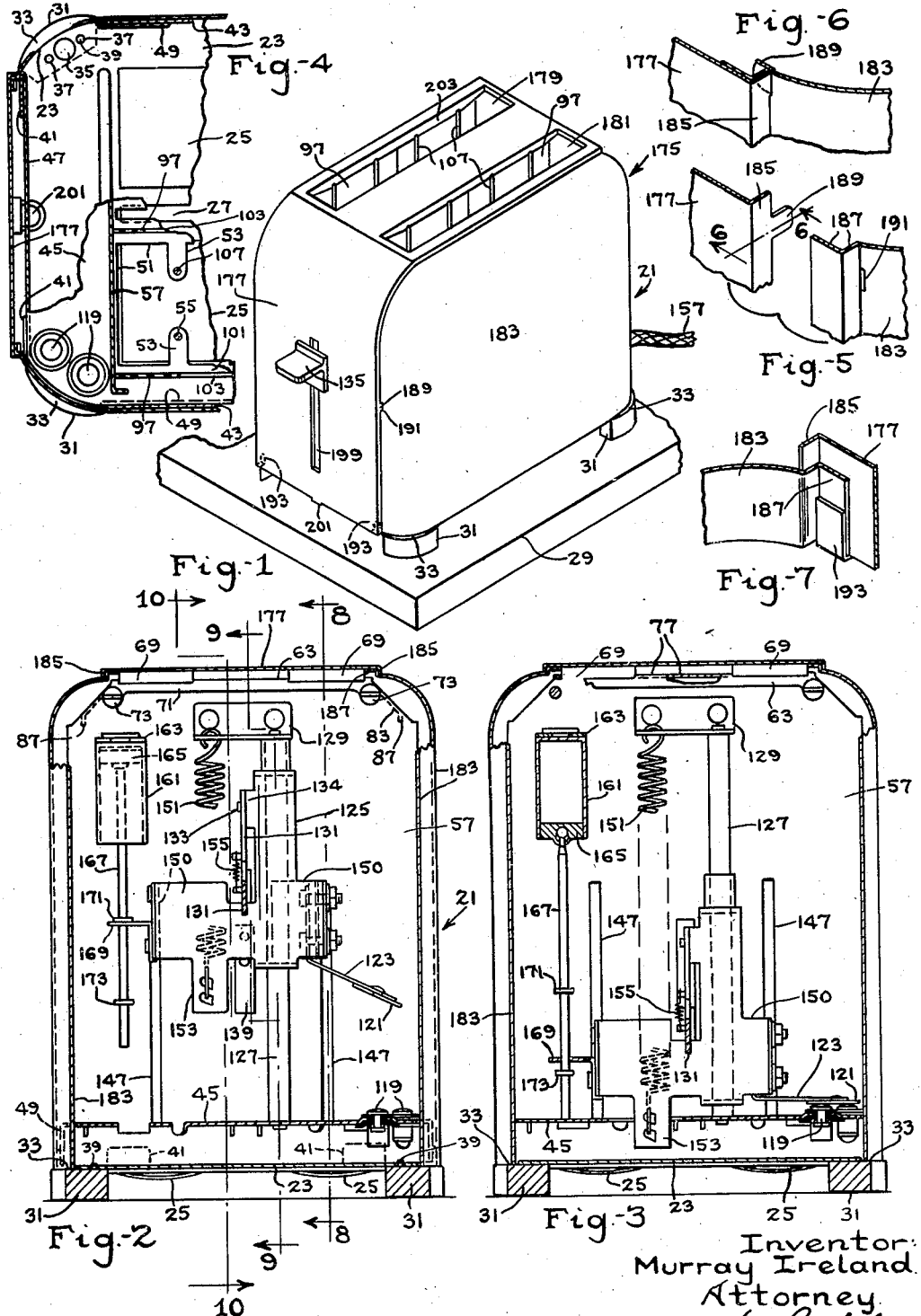
Inventor:
Murray Ireland.
Attorney,
HM Biebel

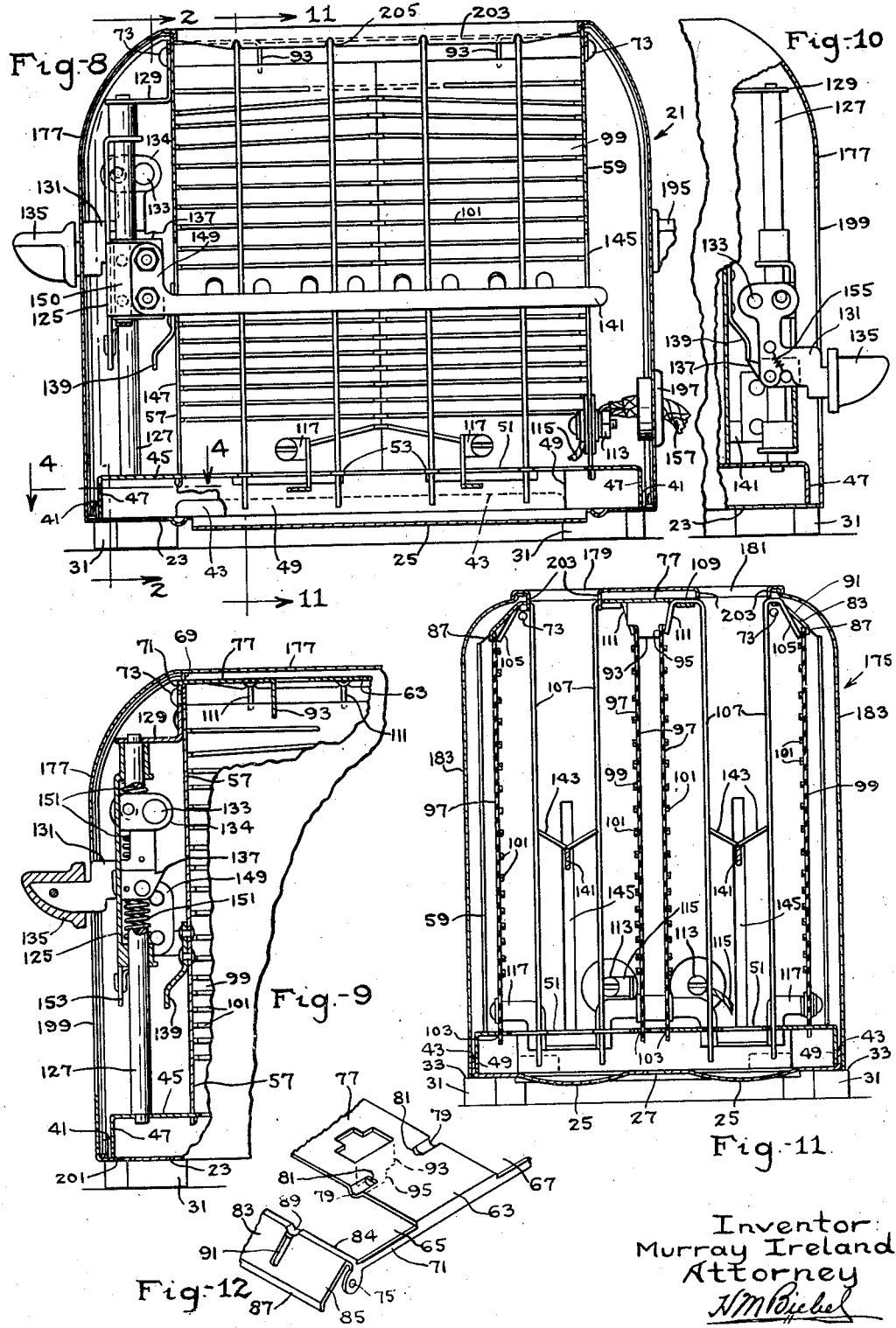

Patented Dec. 27, 1938

2,141,867

UNITED STATES PATENT OFFICE 2,141,867

ELECTRIC TOASTER

Murray Ireland, St. Paul, Minn., assignor to McGraw Electric Company, Chicago, Ill., a corporation of Delaware Application June 30, 1937, Serial No. 151,221

11 Claims. (Cl. 53—5)

My invention relates to electric cooking appliances and particularly to electric toasters.

Among the objects of my invention are the following: To provide an encased toaster structure containing a minimum number of parts; to provide a toaster structure in which the parts interfit with each other to be held in proper operative positions; to provide a simple structure for the intended purpose; to provide a casing for a toaster that shall be so designed and constructed as to provide its own finish strip and to provide a toaster casing having relatively simple means to hold the parts thereof in tightly assembled condition. Other objects of my invention will hereinafter appear.

In the drawings,

Figure 1 is a perspective view of a toaster embodying my invention,

Fig. 2 is a view in lateral vertical section therethrough taken on the line 2—2 of Fig. 8 showing parts there in non-toasting position, Fig. 3 is a view similar to that of Fig. 2 but with parts thereof shown in toasting position, Fig. 4 is a fragmentary view, in horizontal section, taken on the line 4—4 of Fig. 8, Fig. 5 is a fragmentary view, in perspective, of certain parts of the casing before assembly, Fig. 6 is a view in perspective of the parts of Fig. 5 after assembly and taken on the line 6—6 of Fig. 5, Fig. 7 is a fragmentary view in perspective of a part of the assembled casing showing interlocking means thereon, Fig. 8 is a view in vertical longitudinal section taken on the line 8—8 of Fig. 2, Fig. 9 is a fragmentary view in vertical longitudinal section taken on the line 9—9 of Fig. 2, Fig. 10 is a fragmentary view in vertical longitudinal section taken on the line 10—10 of Fig. 2, Fig. 11 is a view in vertical lateral section taken on the line 11—11 of Fig. 8, and, Fig. 12 is a fragmentary view in perspective of the top frame plate.

The device embodying my invention is shown more particularly as an oven type toaster in which slices of bread to be toasted are placed into the toasting chamber from the top thereof and is here shown as a two-slice toaster, although the capacity of the toaster is immaterial.

A toaster 21 includes a base 23 which may be generally rectangular form and may have portions 25 bent downwardly out of the normal plane thereof to provide crumb trays under the respective toasting chambers. The under cover is also provided with one or more slots 27 therein, (see Figs. 4 and 11), to permit of ventilation of the toasting chamber in a manner now well known in the art.

The base is shown as supported above a table top 29 (see Fig. 1 of the drawings) by means of heat insulating supports 31, located at the respective corners of the substantially rectangular base. Each of these supports has a portion 33 extending beyond the outer periphery of the adjacent part of the base for a purpose to be hereinafter referred to and each of these supports is secured to the base as by a suitable rivet 35 (see Fig. 4). The base is provided at each corner thereof with a plurality of small openings 37 spaced from the rivet 35 (see Fig. 4). The base is provided at each corner thereof with a plurality of small openings 37 spaced from the rivet 35 and each of the supports is provided with a pair of projections 39 on their upper surfaces, which projections are adapted to interfit with the openings 37 to thereby prevent any turning movement of the supports with respect to the base, which turning movement might otherwise be permitted by the single securing means. While I have shown four separate supports, I do not wish to be restricted thereto, as I may use a skeleton support below the base, the top face of the support being large enough to extend beyond the adjacent edge of the base.

The base is provided with a plurality of upwardly extending short flanges 41 at each end thereof. The base is also provided at each of its sides with an upwardly extending flange 43, the use of these flanges being referred to hereinafter.

A toasting chamber structure is adapted to be positioned on the base and includes a bottom plate 45 which has the same general contour as does the base. The bottom plate includes depending flanges 47 at the front and the rear end thereof as well as depending flanges 49 at each of its sides, these flanges being so designed and positioned that they will interfit with the hereinbefore described flanges 41 and 43 on the base and will be positioned inside of these flanges as is shown in Figs. 8 and 11 of the drawings. The bottom plate is provided with two openings 51 therein. A number of projections 53 (see Fig. 4 of the drawings) extend laterally of the walls adjacent the openings 51 in the bottom plate toward each other and are provided with apertures 55 near the outer ends for a purpose which will hereinafter appear.

The chamber structure includes a front intermediate wall 57 and a rear intermediate wall 59, the bottom portions of which have extensions projecting through suitable openings in the bottom plate 45, certain of these projections being such as to permit of their being twisted after being extended through the bottom plate whereby the bottom plate may securely support and hold the front and rear intermediate plates. A top frame plate 63 extends across and between the upper ends of the front and rear intermediate plates 57 and 59 and a part of this top frame plate is shown particularly in Fig. 12 of the drawings. As will be noted by reference to this figure of the drawings, the top frame plate is provided with two spaced longitudinally-extending openings 65 and 67 which openings are provided to permit of insertion and removal of slices of bread into the toasting chamber.

The front and rear intermediate walls 57 and 59 are provided with extensions 69 at the top end thereof, which extensions are adapted to fit into the openings 65 and 67 immediately adjacent the lateral depending flange portions 71 of the top frame plate 63, shown particularly in Fig. 12 of the drawings. The top frame plate is secured to the front and rear intermediate walls by screws 73 extending through holes 75 in the depending flange portion 71 at the respective ends thereof.

The intermediate portion 77 of the top frame plate between the openings 65 and 67 is provided with a plurality of spaced depressions 79 at each side edge thereof and in the present instance four such depressions are provided at each edge of the part 77, there being apertures 81 through the part 77 at the inner end of the respective depressions. Each of the outer portions 83 of the top frame plate has an inner portion 84 located in substantially the same plane as is the intermediate part 77, an angularly downwardly depending portion 85 and ends in a narrow depending portion 87 substantially as shown in Fig. 12 of the drawings. The substantially horizontally extending inner portion 84 is provided with depressions 89 similar to those provided in the edges of portion 77 and the angularly downwardly extending portion 85 is provided with slots 91 alined with the depressions 89. The central part 77 has two punched-out tongue portions 93 depending therefrom, the general shape being shown in Fig. 12 of the drawings and including an end portion 95 of reduced width which may be considered as shoulders or shoulder portions and whose use will be hereinafter referred to.

The toaster frame structure includes a plurality of substantially vertically extending heating elements 97 comprising one or more sheets 99 of relatively thin electric-insulating material, on which there is wound a resistor strip or wire 101 and it is to be noted that substantially all of the length of this resistor is wound on that face of the electric-insulating sheet which is adjacent to a slice of bread being toasted. It may be here pointed out that two such heating elements 97 are provided for each slice of bread and the drawings show a two-slice toaster so that a total of four electric heating elements are provided.

The bottom frame plate 45 is provided with elongated slots 103, while the lower end portion of each insulating sheet 99 is provided with a preferably integral tab or reduced extension. Each such tab is received within one of the elongated slots 103, whereby each sheet of insulating material is held in proper operative position relatively to the bottom frame plate.

The upper ends of the respective sheets of electric insulating material are held in their proper operative positions in the following manner, reference being here made particularly to Fig. 11 of the drawings. The upper ends of the respective outermost sheets 99 are prevented from movement in an outwardly direction by engagement with the inside face of the portion 87 of the top frame plate. Movement of these outermost sheets of electric insulating material in an opposite direction is prevented by depending portions 105 of guard wires 107, substantially as shown in Fig. 11 of the drawings. These guard wires are suspended from the top frame plate and the outermost rows of guard wires have upper end portions which fit into the depressions 89 in portions 84 of the top frame plate to be thereby positioned and held against movement longitudinally of portion 83. The angularly depending portions 105 are positioned in and extended through the elongated openings 91 in portions 83 of the top frame plate, substantially as shown in Fig. 11 of the drawings. The lower end portions of the outermost guard wires extend through the openings 55 in the inwardly projecting portions 53 of the bottom frame plate.

The upper edge portions of the two innermost sheets of electric-insulating material are adapted to fit into the shoulders or notches 95 in the depending portions 93 of the central part 77 of the top frame plate as will be seen by reference to Fig. 11 of the drawings. The inner two sets of guard wires 107 have lateral top portions 109 of appreciable length, (see Fig. 11), as well as angularly depending portions 111. The portions 109 of the respective guard wires are adapted to be received in the several depressions 79 in the central portion 77 and the portions 111 are adapted to extend through the apertures 81 substantially as shown in Fig. 11 of the drawings, the lower ends of the respective portions 111 overlapping the upper ends or edges of the sheets of electric-insulating material to prevent movement of these upper edges in a direction away from the depending shouldered portions 93. Since each of the plates of electric-insulating material supporting the resistor have interfitting engagement with the bottom frame plate as hereinbefore explained, and since the upper edge portions of each of the plates of electric-insulating material are held between depending parts of the top frame plate and parts of a plurality of guard wires, it is evident that the plurality of spaced heating elements are held in relatively fixed positions in the toaster frame structure.

Terminal members 113 are insulatedly supported on the rear intermediate plate 59 near the bottom thereof and suitable connections 115 extend therefrom to the respective terminals 117 on the several heating elements whereby suitable connections may be made through a control switch now to be described. A pair of contact members 119 are insulatedly supported on the bottom plate 45 at one front corner thereof and it is to be understood that these fixedly supported contact members are to be included in the circuit with the electric heating elements. Means engaging the contact members 119 to close a circuit through the electric heating elements includes a contact bridging member 121 supported by a resilient strip 123 which is insulatedly mounted on a carriage 125 which carriage is adapted to be moved vertically on a standard 127. The lower end of this standard interfits with and is supported by the bottom plate 45 while its upper end is held by a bracket 129 of substantially L-shape secured to front intermediate plate 57.

Means for causing a downward movement of carriage 125 may include a member 131, of generally L-shape, which is pivotally suspended from a pivot pin 133 extending through member 131 near its upper end and fixed in a rearwardly extending flange 134 of carriage 125. An actuating knob 135 may be secured to the outer end of the substantially horizontal extending portion of member 131 which knob is adapted to be located outside of a casing to be hereinafter referred to in greater detail. Member 131 has a spring biased catch 137 pivotally mounted thereon which catch is adapted to be moved downwardly past a latch 139 (see Fig. 10) to thereby hold the carriage and other parts controlled thereby and movable therewith in predetermined operative positions.

Means for supporting one or more slices of bread include bars 141 having integral angularly outwardly and upwardly extending projections 143 at each side thereof (see Fig. 11) upon which a slice of bread may be supported. These bread slice support bars 141 extend through slots 145 in the rear intermediate plate 59 and extend through the front intermediate plate 57 through similar slots 147 and have front portions 149 whereby they may be secured to carriage 125 which is provided with lateral and rearwardly extending portions 150 for that purpose.

Means for resiliently biasing the control switch for the heating elements to open position and the carriage and bread slice supports to an upper or non-toasting position includes a spring 151 having its upper end portion connected to an upper part of bracket 129 and its lower end connected to a lower part 153 of carriage 125. If an operator desires to move the carriage downwardly, he presses on the actuating knob 135 and catch 137 is so constructed and arranged that it will ride past latch 139 during its downward movement but will be caused to move underneath latch 139 by a spring 155 to thereby hold the bread slice supports and the carriage in their lower positions, which is also the toasting position for the slices of bread, while at the same time contact bridging member 121 is held in close operative engagement with contact members 119 thereby causing energization of the heating elements, it being assumed of course that a twin conductor cord 157 has its outer end connected to a suitable source of supply of electric energy.

To cause movement of the bread slice supports and the carriage in an upwardly direction and simultaneous disengagement of the contact bridging member 121 from contacts 119, the operator need only cause a slight upward movement of knob 135 with the finger, whereby catch 137 will be moved in a counterclockwise direction (as seen in Fig. 10) so that spring 151 will become effective to quickly move the carriage upwardly on standard 127.

In order to prevent undue jarring of the relatively light toaster assembly at the end of the upward movement of the carriage by reason of the spring 151, I provide a shock-absorbing means on the carriage and on the front intermediate plate 57. This shock-absorber includes a dash pot 161 which is held by a bracket 163 secured to the front intermediate plate 57 near its upper end portion, a piston 165 movable therein and a piston rod 167 extending through an opening in a lateral extension 169 secured to a part of carriage 125. Collars 171 and 173 are secured to the piston rod 167 and are spaced apart a suitable distance so that during downward movement of carriage 125, member 169 will engage lower collar 173 and move piston 165 downwardly in cylinder 161 to substantially the position shown in Fig. 3 of the drawings. On upward movement of the carriage, member 169 engages upper collar 171 causing upward movement of piston 165 in cylinder 161 thereby effecting a more gradual deceleration and final stopping of the upward movement of the carriage with less jar than would otherwise be the case. It is obvious that the shock absorber is effective during the downward movement of the carriage and the bread slice supports but since this movement is effected manually it will not be particularly noticeable to an operator.

An outer casing 175 includes a central portion 177 constituting front and rear walls and a top wall, the general shape of part 177 of the casing being that of an inverted U. The top part of member 177 is provided with openings 179 and 181 registering with openings 65 and 67 in the top frame plate, slices of bread being insertable into the toasting chamber in the frame structure and removable therefrom through these openings 179 and 181. The casing includes also two side walls 183 which have interfitting and interlocking engagement with member 177 of inverted U-shape. For this purpose, the side edges of member 177 are each provided with a laterally extending flange 185 (see Fig. 5) while three of the edges of the top and of the sides of each of the respective members 183 are provided with a shouldered flange 187 (see Fig. 5). The vertical portions of member 177 and particularly flanges 185 have lugs or extensions 189 thereon at substantially near the mid portion of their lengths which lugs are adapted to extend into and through openings 191 in side wall portions 183, the general position of lugs 189 being shown in Fig. 1 of the drawings. These lugs 189 are adapted to be bent over against the adjacent portions of the side wall so that the interfitting portions shown particularly in Fig. 5 of the drawings will hold them in tightly assembled relation relatively to each other. At the bottom edge of member 177 I provide at each side thereof an integral depending extension 193, which extension is bent upwardly and around a part of the shouldered flange 187 whereby the lower edge portions of member 177 and the adjacent portions of side walls 183 are held in fixed tightly assembled positions.

The rear wall of member 177 may have a carrying knob 195 secured thereto and a bushing 197 of electric-insulating material may be provided through which cord 157 extends in the usual manner. The front wall of member 177 is provided with an elongated vertical slot 199 therein through which extends member 131.

The front and the rear wall portions of member 177 are provided with integral lugs 201 depending from the lower edges thereof which lugs are adapted to be bent over edge portions of the base substantially as shown in Figs. 4 and 9 of the drawings. Since the front and rear edge portions of the base are resilient, it is evident that if lugs 201 are bent therearound while pressure is applied to the top of the casing, the casing will be forced downwardly with its top portion in engagement with certain parts of the frame structure as will be referred to hereinafter while its bottom edge will rest upon and be in close engagement with the upper surface of the projecting parts 33 of the insulating supports 31.

As has already been set forth hereinbefore, the bottom plate of the frame structure interfits with the base inside of the same and, as seen from Fig. 1 of the drawings, the bottom edge of the casing overlaps the base to thereby provide its own finish strip and present a pleasing appearance of the assembled toaster.

A part of the edge of intermediate member 177 at each side of openings 179 and 181 is bent downwardly in the form of flanges 203 which flanges have upwardly extending notches 205 therein. The outermost flanges 203 overhang the inner edge portions 84 of parts 83 of the top frame plate and the inmost flanges overhang the outer edge portions of central part 77 of the top frame plate as shown more particularly in Fig. 11 of the drawings. Further, the upper end portions of the respective guard wires are adapted to fit into the notches 205 whereby relative movement of the guard wires, the top frame plate 63 and the top part of casing portion 177 is effectively prevented. This insures a relatively solid and unyielding structure which, at the same time, is quickly and easily assembled and disassembled in case of necessity.

It may further be pointed out that the outermost depending flanges 203 are effective to prevent inward movement of the shouldered portions of side wall 183 as will be seen particularly by reference in Fig. 11 of the drawings.

The device embodying my invention thus provides an electric cooking device and particularly a toaster having a minimum number of parts, in which certain of the parts interfit with each other in a manner to permit not only of easy and quick assembly but also of maintaining the various parts in proper operative positions relatively to each other without the use of additional securing means. It is obvious that the toaster frame structure constituting or providing a toasting chamber is a unit in itself and therefore permits of sub-assembly operation in building up the toaster. The toaster frame structure is not secured to any other part of the assembly but merely rests upon the base with which it has interfitting engagement in such a manner as to prevent relative movements thereof, while the casing interfits with parts of the toaster frame structure to prevent movement in any direction, and the casing is secured only to the base by relatively few and very simple means.

Various modifications may be made in the device embodying my invention without departing from the spirit and scope thereof, and I desire therefore that only such limitations shall be placed thereon as are imposed by the prior art or are set forth in the appended claims.

I claim as my invention:

1. A toaster comprising a base, supporting means for the base, a toasting chamber structure on the base, an outer casing substantially enclosing and concealing the toasting chamber structure and the base, the lower marginal edge of the outer casing engaging and being supported by said supporting means and means to hold the outer casing, toasting chamber structure, base and supporting means in definite operative relationship.

2. A toaster comprising a base, supporting means secured thereto and projecting beyond the outer periphery thereof, a toasting chamber structure resting on said base defining a heatable toasting chamber, an open bottom casing and cooperating means on the casing and on the base for holding the casing with its bottom edge outside of and covering the outer peripheral edge of said base and engaging the supporting means and for causing the casing to hold the frame structure against the base.

3. An electric toaster comprising a casing having an open bottom, a frame structure constituting a toasting chamber and comprising a bottom plate having depending peripheral flange portions, a base having upwardly extending flange portions adapted to interfit with the depending flange portions on the bottom plate and cooperating means on the casing and the base to hold all of said members in proper operative positions relatively to each other, the bottom edge of the casing covering the flange portions on the bottom plate and on the base and constituting the external finish strip at the bottom of the toaster.

4. An electric toaster comprising an open bottom outer casing having a pair of spaced depending flange portions in the top part thereof, notches in said depending flange portions, a frame structure within the casing including a front wall, a rear wall and a top frame plate adapted to be received between said pair of spaced flange portions to prevent relative movement of the top parts of the frame structure and of the casing in one direction, said top frame plate having notches therein adapted to register with the notches in the depending flange portions and guard wires supported by said top frame plate and having an intermediate portion thereof fitting in said registering notches to prevent relative movement of the top parts of the frame structure and of the casing in another direction.

5. A toaster comprising a base, a toasting chamber structure on said base, a walled casing substantially enclosing said chamber and a single lug at the bottom edge of each of two opposed walls of the casing extending around the adjacent outer peripheral edge of the base to hold all of said elements in tightly assembled proper operative positions relatively to each other.

6. In a toaster a heatable toasting chamber structure and an open bottom casing thereover, said casing comprising a member of inverted U-shape having inturned flanges on its side edges, wall members having three shouldered edges interfitting with said flanged side edges and a lug at each side of the end edges of the member of inverted U-shape bent over the adjacent part of the shouldered edge of a wall member to hold the interfitting edges of the member of U-shape and of the wall members in closely assembled position.

7. In a toaster, a heatable frame structure and an open bottom casing thereover, said casing comprising a member of inverted U-shape constituting top, front and rear walls, the side edges of said member of U-shape having inturned flanges, side walls having shouldered flanges on three edges adapted to interfit with the flanges on the member of U-shape, lugs at the respective ends of the member of U-shape return bent over the shoulder flange of the side wall to prevent inward movement of the side wall relatively to the member of U-shape and to cause the top edge of the side walls to engage the top wall of said member of U-shape.

8. A toaster as set forth in claim 6 in which the top wall of said member of U-shape is provided with a depending longitudinally extending flange engaging the shouldered flange on a side wall to prevent inward movement of the top part of the side wall relatively to the member of inverted U-shape.

9. A toaster comprising a base, a toaster frame structure thereabove, an open bottom casing substantially enclosing said frame structure, heat insulating supports below the base, each having a part thereof extending beyond the outer periphery of the base, said extending part being adapted to have abutting engagement with the lower edge of the casing and interfitting means on the base and the respective supports to prevent turning movement of the supports relatively to the base.

10. A toaster comprising a base, a toaster frame structure resting thereon but unsecured thereto, an open bottom casing substantially enclosing said frame structure, heat insulating supports below the base, each having a marginal part extending beyond the outer periphery of the base, said extending part being adapted to be engaged by the lower edge of the casing to limit downward movement of the casing relatively to the base, cooperating pin and socket means on the respective supports to prevent turning movement of the supports relatively to the base and cooperating means at the lower edge of the casing and on the base to hold the casing against the frame structure and against the supports.

11. An electric toaster comprising a casing, a frame structure in said casing and having a front wall, a carriage and a bread slice support connected therewith reciprocally movable relatively to the frame structure into toasting and non-toasting positions, a spring connected with the front wall and the carriage for normally holding the bread slice support in non-toasting position, a stop supported by said front wall engageable by said carriage for limiting the movement of the carriage when moving to non-toasting position and shock absorbing means for reducing the impact of the carriage on said stop, said shock absorbing means including a dash pot supported by said front wall, a piston movable in said dash pot and having a piston rod connected therewith, an extension on said carriage guiding said piston rod and actuating said piston and means on said piston rod providing a lost motion connection between said carriage extension and said piston to cause the shock absorber to be effective during only the end portion of the movement of the carriage to non-toasting position.

MURRAY IRELAND.